United States Patent
Hallden et al.

(10) Patent No.: US 6,918,574 B2
(45) Date of Patent: Jul. 19, 2005

(54) REDUCED TORQUE GATE VALVE WITH ROLLER SCREW

(75) Inventors: Donald F. Hallden, Houston, TX (US); David E. Cain, New Braunfels, TX (US); Gregory L. Glidden, Spring, TX (US); William L. Scott, Spring, TX (US)

(73) Assignee: FMC Technologies, Inc., Chicago, IL (US)

( * ) Notice: Subject to any disclaimer, the term of this patent is extended or adjusted under 35 U.S.C. 154(b) by 0 days.

(21) Appl. No.: 10/226,570

(22) Filed: Aug. 23, 2002

(65) Prior Publication Data

US 2003/0038266 A1 Feb. 27, 2003

Related U.S. Application Data

(60) Provisional application No. 60/314,985, filed on Aug. 24, 2001.

(51) Int. Cl.[7] .................................................. F16K 3/00
(52) U.S. Cl. ...................................... 251/327; 251/267
(58) Field of Search ................................ 251/264, 266, 251/267, 268, 326, 327, 328; 74/424.71; 384/28

(56) References Cited

U.S. PATENT DOCUMENTS

| 3,223,380 | A | * | 12/1965 | Hochmuth et al. | ......... 251/284 |
|---|---|---|---|---|---|
| 3,770,247 | A | | 11/1973 | Nelson | |
| 4,264,054 | A | | 4/1981 | Morrill | |
| 5,090,661 | A | | 2/1992 | Parks, Jr. et al. | |
| 5,192,051 | A | * | 3/1993 | Roberson | .................... 251/328 |
| 6,572,076 | B1 | * | 6/2003 | Appleford et al. | ............ 251/69 |

FOREIGN PATENT DOCUMENTS

| FR | 2 536 822 A1 | 6/1984 |
|---|---|---|
| WO | WO 01/14775 A1 | 3/2001 |

* cited by examiner

Primary Examiner—Edward K. Look
Assistant Examiner—John K. Fristoe, Jr.
(74) Attorney, Agent, or Firm—Henry C. Query, Jr.

(57) ABSTRACT

A gate valve is disclosed which comprises a valve body which includes a flow bore that extends completely therethrough and a gate cavity that extends partially therethrough and intersects the flow bore, a bonnet which is connected to the valve body over the gate cavity, a gate which is disposed in the gate cavity across the flow bore and includes a transverse opening that extends completely therethrough, a valve stem which includes a first portion that is connected to the gate and a second portion that extends through the gate cavity, a handwheel, and a roller screw assembly which is connected between the handwheel and the second portion of the valve stem and which converts rotation of the handwheel into translation of the valve stem. In this manner, translation of the valve stem raises or lowers the gate to bring the opening into or out of alignment with the flow bore to either open or close the gate valve, respectively.

15 Claims, 3 Drawing Sheets

REDUCED TORQUE GATE VALVE WITH ROLLER SCREW

This application is based on U.S. Provisional Patent Application No. 60/314,985, which was filed on Aug. 24, 2001.

BACKGROUND OF THE INVENTION

The present invention is directed to a gate valve. More particularly, the invention is directed to a manually actuated, rising stem gate valve which includes a roller screw assembly to efficiently convert rotation of the handwheel into translation of the valve stem.

Gate valves are used in a variety of industries to control the flow of fluids. In particular, gate valves are used extensively in the oil and gas industry to control the flow of produced fluids at various stages of production. Most gate valves used in this industry comprise a valve body having a longitudinal flow bore and a transverse gate cavity that intersects the flow bore. A gate having a gate opening extending transversely therethrough is disposed in the gate cavity. A stem is provided for moving the gate between an open position, in which the gate opening is aligned with the flow bore, and a closed position, in which the gate opening is offset from the flow bore. The gate is usually positioned between a pair of seats, each of which seals against the gate under pressure to prevent fluid from passing through the flow bore when the gate is in the closed position.

The gate cavity is normally covered by a bonnet having an axial through bore. The stem passes through the through bore and is sealed to the bonnet by a stem packing to contain the fluid pressure within the gate cavity. Many gate valves are also provided with a backseat mechanism, that is, cooperating sealing surfaces on the stem and the bonnet which are located below the stem packing. Often a desire exists to perform maintenance or repair on the gate valve, such as replacing the stem packing, without removing the gate valve from the conduit system to which it is connected. In such instances, the stem is moved upwardly until the backseat sealing surfaces on the stem and the bonnet engage and form a metal-to-metal seal. This backseating procedure thus isolates the stem from the gate cavity and allows the desired maintenance to be performed without having to remove the gate valve from the conduit system. For safety reasons, the pressure in the gate cavity is bled down to ambient pressure before any maintenance is performed. In addition, any residual pressure between the stem packing and the backseat is usually bled off through a bleeder plug provided in the bonnet.

Gate valves are provided with means for manipulating the stem to raise and lower of the gate. In this respect, gate valves may be divided into two groups: (a) rising stem gate valves and (b) non-rising stem gate valves. In a non-rising (or rotating) stem gate valve, the stem is threadedly connected to the gate such that rotation of the stem causes the gate to move up and down. An actuation mechanism is provided for selectively rotating the stem clockwise or counterclockwise in order to open or close the gate valve. On this type of gate valve, the backseat is set by driving the gate down until it bottoms out on the valve body, and then allowing the stem to move upward until it backseats against the bonnet. Such valves may be automatically or remotely actuated, such as by an electric motor. Alternatively, these gate valves may be manually actuated, such as by a handwheel adapted to rotate the stem directly. An example of such a manual gate valve is shown in U.S. Pat. No. 5,762,320 to Williams et al.

In a rising stem gate valve, the stem is attached to the gate in a manner which prevents axial movement of the stem relative to the gate. A mechanism is then provided for selectively driving the stem up and down in order to open and close the valve. On this type of gate valve, the backseat is set by moving the stem and the gate upwards until the stem backseats against the bonnet. Such valves may be automatically or remotely actuated, such as by a hydraulic cylinder. Alternatively, these valves may be manually actuated by providing a transmission means to convert the rotational motion of a handwheel into axial motion of the stem.

One such transmission means is a direct threaded connection between the handwheel and the stem. Unfortunately, for many large or high pressure valves which require large actuating forces, this method requires more torque to be applied to the handwheel than is practical to exert by hand. When the valve is closed, the entire upstream side of the gate is exposed to the full working pressure of the fluid while a portion of the downstream side of the gate is often at ambient pressure. This pressure differential results in very high forces which push the gate against the downstream seat. This engagement between the gate and the downstream seat in turn creates large gate-to-seat drag forces which must be overcome when gate is moved from the closed position to the open position. Another force which must be overcome is the drag which the stem packing exerts on the stem.

Rising stem gate valves can be further divided into two types: (a) balanced stem gate valves and (b) un-balanced stem gate valves. In a balanced stem gate valve, a second stem is attached to the gate at the end opposite the first stem. An example of this type of gate valve is shown in U.S. Pat. No. 4,230,299 to Pierce, Jr. It will be appreciated that when pressurized fluid is present in the gate cavity, a force is exerted on each stem which is equal to the product of the pressure and the cross-sectional area of the stem where it passes through the stem packing. In a balanced stem gate valve, the forces acting on the two stems will cancel each other out, resulting in substantially zero (or a balanced) net force to overcome when moving the gate. The disadvantages of balanced stem gate valves include increased cost and complexity and the creation of an additional potential leak path between the second stem and its corresponding stem packing.

An example of an unbalanced stem gate valve is disclosed in U.S. Pat. No. 4,569,503 to Karr, Jr. Although in this type of gate valve the unbalanced stem forces must be overcome when moving the gate, it will be appreciated that this design is simpler than the balanced stem gate valve. In the valve shown in Karr, Jr., the gate opening is disposed in the upper part of the gate, such that the valve is open when the gate is in its lowered position and closed when the gate is in its raised position. The disadvantage of this configuration is that when the valve is moved from the closed position to the open position, both the unbalanced stem force and the maximum gate-to-seat drag forces must be overcome simultaneously.

In order to overcome these combined forces and still maintain the required handwheel torque at an acceptable level, a transmission means which provides a substantial mechanical advantage must usually be utilized. Karr, Jr. provides a ball screw device for raising and lowering the stem. Other valves utilize bevel or worm gear reduction boxes. One disadvantage of these devices is that, in order to sufficiently reduce the required torque on the handwheel, the gear ratio must be very high. Consequently, a large number of turns is required to open or close the valve. Moreover, since the rate at which an operator can turn the handwheel is limited, the gate necessarily traverses very slowly from one position to the other.

This relatively slow traverse is especially troublesome when moving the gate from the closed position to the open position. As soon as the gate opening intersects the flow bore in the downstream seat, the gate-to-seat seal is broken and a high velocity jet of fluid is forced through the intersection area. In many cases, the fluid may contain abrasive particles which tend to erode the valve components during high velocity flow. The longer the intersection area remains small, the longer it takes for pressure to equalize on the opposites sides of the gate. Thus, the slower the gate moves to the open position, the greater the amount of erosion.

A further disadvantage of the gate valves shown in the Williams et al., Pierce, Jr. and Karr, Jr. patents is that these valves must be in the closed position in order to backseat the stem against the bonnet. Consequently, multiple actuations of the valve are required to ensure that both the gate cavity and the bonnet are at ambient pressure. Typically, the valve must first be actuated to the open position in order to bleed down the system pressure on both sides of the valve. Then the valve must be actuated to the closed position in order to backseat the stem against the bonnet.

SUMMARY OF THE INVENTION

In accordance with the present invention, these and other disadvantages in the prior art are overcome by providing a gate valve which comprises a valve body which includes a flow bore that extends completely therethrough and a gate cavity that extends partially therethrough and intersects the flow bore, a bonnet which is connected to the valve body over the gate cavity, a gate which is disposed in the gate cavity across the flow bore and includes a transverse opening that extends completely therethrough, a valve stem which includes a first portion that is connected to the gate and a second portion that extends through the gate cavity, a handwheel, and a roller screw assembly which is connected between the handwheel and the second portion of the valve stem and which converts rotation of the handwheel into translation of the valve stem. In this manner, translation of the valve stem raises or lowers the gate to bring the opening into or out of alignment with the flow bore to either open or close the gate valve, respectively.

In comparison to prior art gate valves, the roller screw assembly requires substantially fewer turns of the handwheel in order to raise and lower the gate. Thus, assuming the operator turns the handwheel at a constant rate, the gate in the gate valve of the present invention will rise substantially faster than the gates in prior art gate valves. Consequently, any erosion of the gate which may occur when the opening first intersects the flow bore will be minimized.

These and other objects and advantages of the present invention will be made apparent from the following detailed description, with reference to the accompanying drawings. In the drawings, the same reference numbers are used to denote similar components in the various embodiments.

DETAILED DESCRIPTION OF THE PREFERRED EMBODIMENTS

Figure 1:
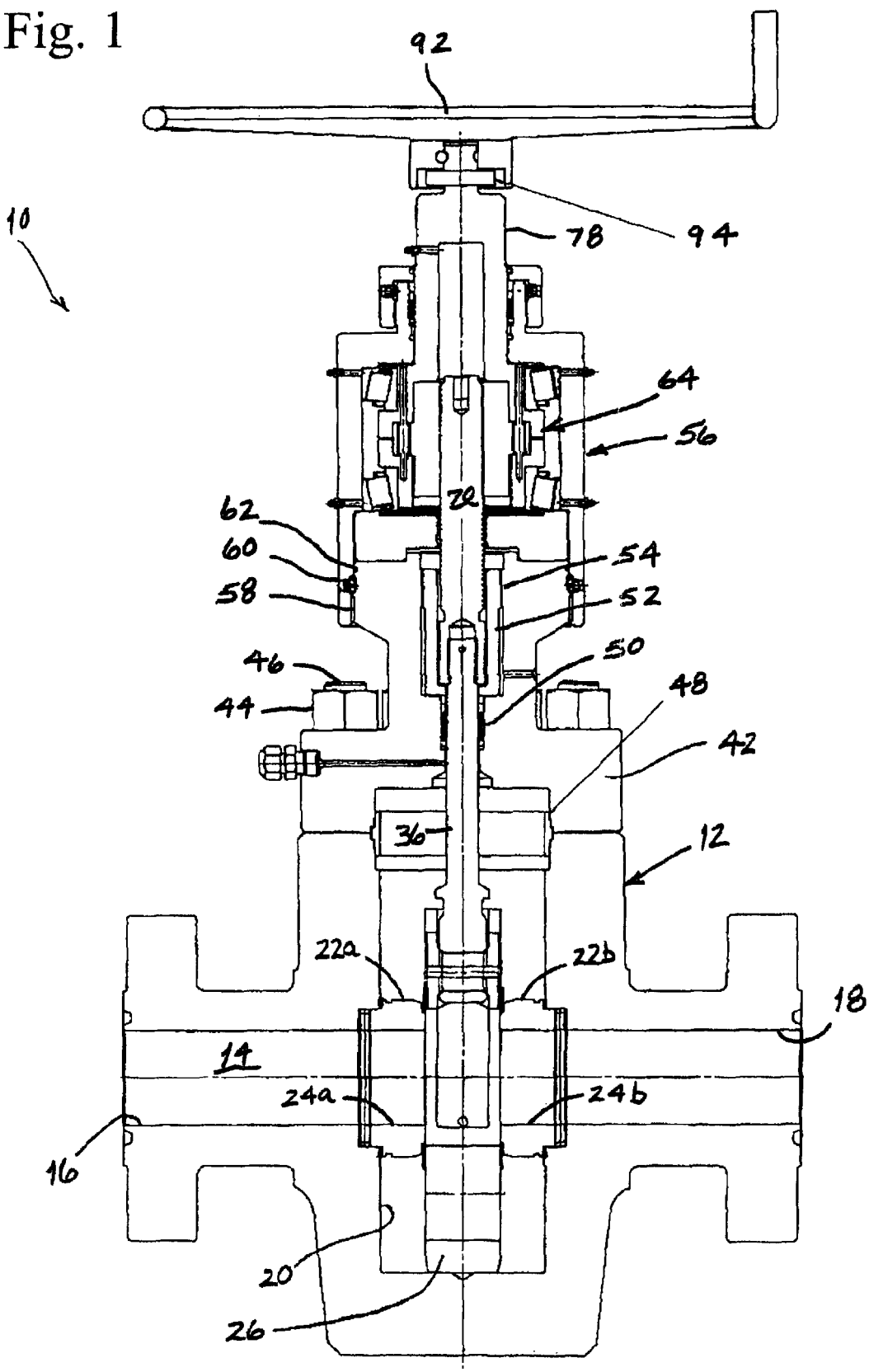
FIG. 1 is a cross sectional view of the gate valve of the present invention shown in the closed position.

Referring to FIG. 1, the gate valve of the present invention, which is indicated generally by reference number 10, is shown to comprise a valve body 12 which comprises a flow bore 14 that extends longitudinally through the valve body between a first port 16 and a second port 18 and a gate cavity 20 that extends partially through the valve body generally transverse to the flow bore. The gate valve 10 also comprises a pair of seats 22a, 22b, each of which is positioned at least partially in a corresponding seat pocket that is formed at the intersection of the flow bore 14 and the gate cavity 20. Each seat 22a, 22b includes a transverse bore 24a, 24b that is aligned with the flow bore 14 to thereby define a flow passage through the valve body 12.

Figure 2:
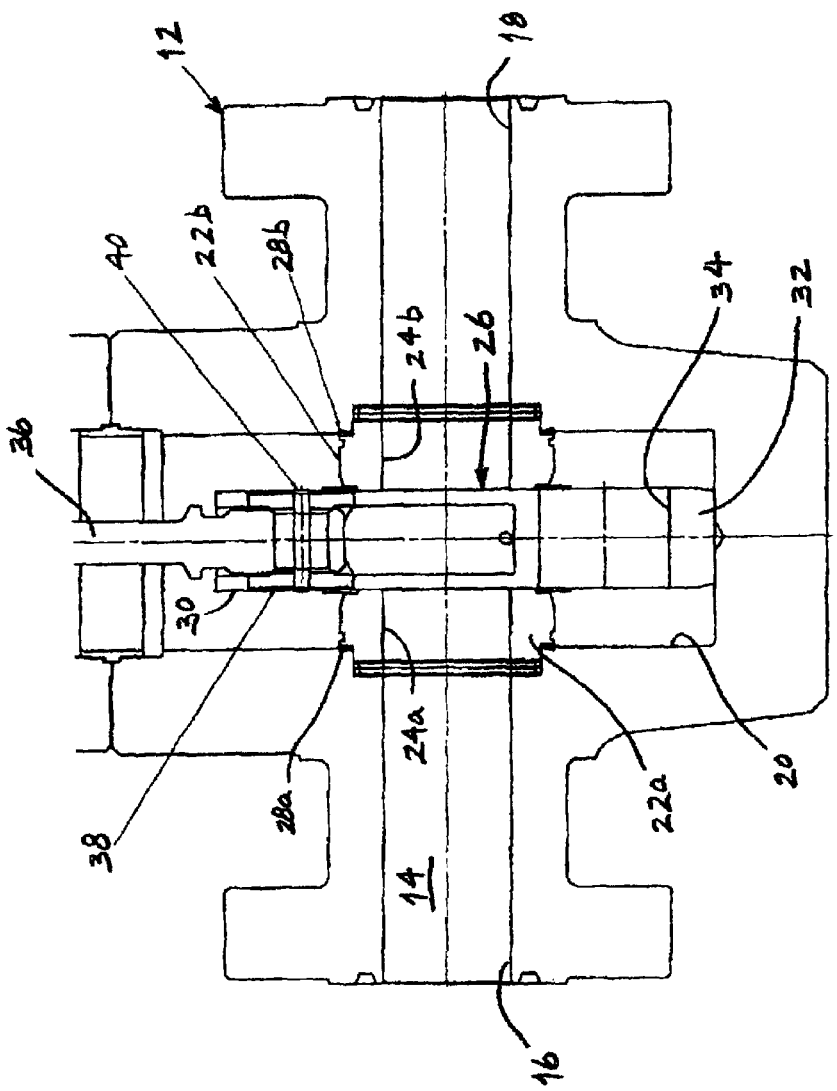
FIG. 2 is a cross sectional view of the lower portion of the gate valve shown in FIG. 1.

Referring also to FIG. 2, the gate valve 10 further includes a gate 26 which is slidably disposed between the seats 22a, 22b, each of which is preferably urged into contact with the gate by a respective Belleville spring 28a, 28b. The gate 26, which in an exemplary embodiment of the invention comprises a generally rectangular configuration, includes an upper end 30, a lower end 32 and a transverse opening 34 that extends completely through the gate proximate the lower end. The gate 26 is secured to a stem 36 by a lift nut 38, which is mounted in a corresponding recess in the upper end 30 of the gate and threaded to the lower end of the stem. In addition, the stem 36 is secured against rotation relative to the lift nut 38 and the gate 26 by a pin 40. Thus, any axial translation of the stem 36 will result in a corresponding translation of the gate 26.

The gate 26 is adapted for reciprocal motion between an upper or open position and a lower or closed position, the latter of which is shown in the Figures. In the open position, the opening 34 in the gate is substantially aligned with the bores 24a, 24b in the seats 22a, 22b, and fluid is permitted to flow though the flow bore 14 between the first and second ports 16, 18. In the closed position, the opening 34 is offset from the bores 24a, 24b and the gate 26 thus blocks the flow of fluid through the flow bore 14. Furthermore, since the gate 26 is secured to the stem 36, the gate valve 10 may be selectively opened or closed by raising or lowering the stem.

Referring again to FIG. 1, the gate valve 10 also includes a bonnet 42 which is secured to the valve body 12 over the gate cavity 20 by suitable means, such as a number of bolts 44 and nuts 46. The bonnet 42 is preferably sealed to the valve body 12 via a bonnet gasket 48. The stem 36 extends upwardly through the bonnet 42 and is sealed thereto by a stem packing 50. The stem packing 50 is retained within the bonnet 42 by a packing nut 52, which is threadedly connected to the bonnet generally at 54.

Figure 3:
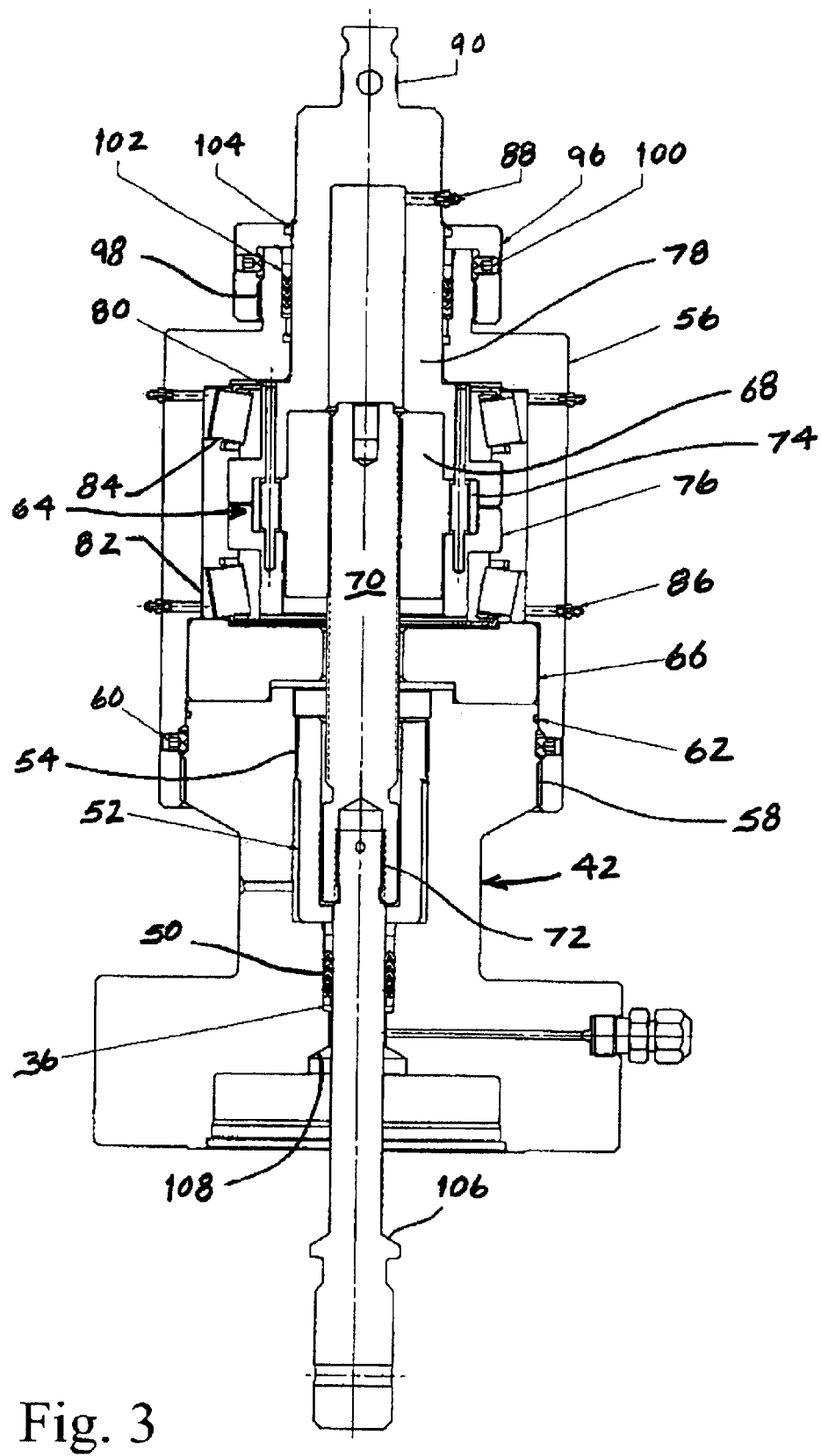
FIG. 3 is a cross sectional view of the upper portion of the gate valve shown in FIG. 1.

Referring also to FIG. 3, the gate valve 10 further includes a generally cylindrical bonnet cap 56, which is secured to the bonnet 42 such as by threads 58. One or more set screws 60 may be provided to prevent relative rotation between the bonnet cap 56 and the bonnet 42. In addition, an O-ring 62 is ideally positioned between the bonnet cap 56 and the bonnet 42 to provide a seal therebetween.

Referring still to FIG. 3, the gate valve 10 further comprises a roller screw assembly 64 which is positioned in the bonnet cap 56 immediately above a thrust bushing 66, which in turn is mounted in the bonnet cap immediately above the bonnet 42. The roller screw assembly 64 includes a roller screw nut 68 which is rotatably connected to a roller screw shaft 70. In a preferred embodiment of the invention, the roller screw nut 68 and the roller screw shaft 70 comprise a planetary roller screw assembly such as is shown and described in the "SKF® roller screws" leaflet published by the SKF Group (Catalogue No. 4351/5E, June 1999, France), which is hereby incorporated herein by reference. In this type of roller screw assembly, the roller screw nut 68 comprises a central bore having internal threads, and the roller screw shaft 70 comprises an outer diameter having corresponding external threads. In addition, disposed between and engaging the internal and external threads are a plurality of threaded rollers (not shown in the Figures), which serve to convert the rotational motion of the roller screw nut 68 into axial translation of the roller screw shaft 70.

The lower end of the roller screw shaft 70 is connected to the upper end of the stem 36 such as by threads 72. The roller screw shaft 70 and the stem 36 are ideally also pinned together to prevent relative rotation therebetween. Thus, it can be appreciated that the roller screw shaft 70, the stem 36, the lift nut 38 and the gate 26 will all translate axially as a unit, but will not rotate relative to each other.

The roller screw nut 68 comprises a radially outwardly extending flange 74 which is disposed between a roller thrust bearing 76 and a roller adapter shaft 78. In addition, the flange 74 is preferably pinned to the roller thrust bearing 76 and the roller adapter shaft 78 via one or more pins 80 so that the roller screw nut 68, the roller thrust bearing and the roller adapter shaft will rotate as a unit. This unit is supported on a lower roller bearing 82 which is mounted between the roller thrust bearing 76 and the bonnet cap 56 and which in turn is supported on the thrust bushing 66. Furthermore, an upper roller bearing 84 is mounted between the roller adapter shaft 78 and the bonnet cap 56. In a manner well known in the mechanical arts, the roller bearings 82, 84 serve to guide the roller thrust bearing 76 and the roller adapter shaft 78 as they rotate, while reducing rotational drag on these components. Roller bearings 82, 84 further serve to transmit axial and radial loads from the roller thrust bearing 76 and the roller adapter shaft 78 to the thrust bushing 66 and the bonnet cap 56. One or more grease fittings 86 and 88 may be provided on the bonnet cap 56 and the roller adapter shaft 78, respectively, for providing lubrication to the roller bearings 82, 84 and the roller screw assembly 64.

The upper end of the roller adapter shaft 78 extends beyond the bonnet cap 56 and terminates in a handwheel adapter portion 90. As shown in FIG. 1, a Handwheel 92 is attached to the adapter portion 90 by suitable means, such as a pin 94.

Referring again to FIG. 3, the gate valve 10 also includes a bonnet cap adapter 96, which is preferably threadedly connected to the bonnet cap 56 generally at 98. In addition, one or more set screws 100 may be provided to prevent rotation of the bonnet cap adapter 96 relative to the bonnet cap 56. The bonnet cap adapter 96 serves to retain a packing 102 which is disposed between the roller adapter shaft 78 and an upper portion of the bonnet cap 56. A wiper ring 104 is ideally positioned between bonnet cap adapter 96 and the roller adapter shaft 78 to prevent contamination of the packing 102.

A primary purpose of the packing 102 is to impart rotational drag to the roller adapter shaft 78. Because the gate valve 10 is an unbalanced stem gate valve, fluid pressure in the gate cavity 20 will impart an upward force on the stem 36. Since the roller screw assembly 64 is somewhat susceptible to backdrive, this upward force could move the gate 26 upwards toward the open position. Therefore, the size, design, material and preload of packing 102 should be selected to provide an optimal amount of drag on the roller adapter shaft 78 to prevent this backdrive.

The normal operation of the gate valve 10 will now be described. In order to open the gate valve 10, an operator applies a torque to the handwheel 92. This torque is transmitted to the roller adapter shaft 78 via the pin 94, and then to the roller screw nut 68 and the roller thrust bearing 76 via the pins 80. As described above, the roller screw assembly 64 serves to convert the torque on the roller screw nut 68 into an upward axial force on the roller screw shaft 70. The resulting downward axial reaction force on the roller screw nut 68 is transmitted through the roller thrust bearing 76, the lower roller bearing 82, the thrust bushing 66 and the bonnet 42 to the valve body 12. It should be noted that the roller screw assembly 64 provides an improved mechanical advantage over the ball screw devices utilized in the prior art. Consequently, less applied torque is required at the handwheel 92 in order to actuate the gate valve 10.

As the handwheel 92 is actuated to open the gate valve 10, the resulting upward axial force on the roller screw shaft 70 is transmitted through the stem 36, the pin 40 and the lift nut 38 to the gate 26. As the torque applied to handwheel 92 is increased, the upward axial force on the gate 26, the stem 36 and the roller screw shaft 70 increases accordingly. When this upward force is sufficient to overcome the sum of the gate-to-seat drag between the gate 26 and the seats 22a, 22b and the stem-to-packing drag between the stem 36 and the packing 50, the gate, the stem and the roller screw shaft 70 will begin to rise towards the open position. At this point, the advantage of using a standard gate 26, with the gate opening 34 proximate the lower end 32, will become apparent. In most gate valves, greater force is required to open the valve than to close the valve. This is because in the closed position, the full differential pressure across the gate creates the greatest gate-to-seat drag. By using a standard gate 26 in the gate valve of the present invention, the upward force acting on the unbalanced stem will help to move the gate into the open position.

As the operator continues to apply torque to the handwheel 92, the handwheel will rotate and the gate 26 will rise. For simplicity sake, let us assume that the high pressure side of the gate valve 10 is to the left of the gate 26 (as viewed in the Figures). Thus, when the gate valve 10 is open, flow will proceed through the flow bore 14 from the first port 16 to the second port 18. As discussed above, when the upper edge of gate opening 34 reaches the bore 24b in the downstream seat 22b, a high velocity jet of fluid will be forced through the intersection of the gate opening and the bore. Therefore, it is desirable to raise the gate 26 as quickly as possible in order to minimize any erosion which may be caused by this jet of fluid.

At this point an additional advantage of the roller screw assembly 64 over prior art ball screws will be made apparent. The roller screw assembly 64 requires substantially fewer turns on the handwheel 92 in order to raise the roller screw shaft 70 the distance required to fully open the gate 26. Thus, assuming the operator turns the handwheel 92 at a constant rate, the gate 26 will rise substantially faster in the gate valve 10 than in prior art gate valves which utilize ball screws. Consequently, erosion of the gate opening 34 and the bore 24b of the downstream seat 22b will be minimized.

As the gate 26 is raised still further, the gate opening 34 will eventually become substantially aligned with bores 24a, 24b in the seats 22a, 22b. In this configuration, the gate valve 10 is fully open and fluid may flow freely through the flow bore 14. As the gate 26 reaches its fully open position, a back seat surface 106 on the stem 36 will engage a corresponding backseat surface 108 on the bonnet 42 and create a metal-to-metal backseat seal. At this point, an additional advantage to using a standard gate 26 will become apparent. With the gate valve 10 thus actuated to the open position and simultaneously backseated, pressure may be bled off from both sides of the gate 26 and from the bonnet 42 without having to actuate the gate valve a second time. Thus, fewer steps are required to ensure that no gage pressure exists in the gate cavity 20 and the bonnet 42. Consequently, maintenance and repair functions, such as replacing the stem packing 50, may be safely performed relatively easily and inexpensively.

When it is desired to close the gate valve 10, the operator rotates the handwheel 92 in the opposite direction, and the roller screw shaft 70, the stem 36 and the gate 26 are driven downward toward the closed position. The unbalanced stem force now opposes the motion of the gate 26. However, this opposing force is offset by the fact that essentially no gate-to-seat drag exists when the gate valve 10 is open since no differential pressure exists across the gate 26. Moreover, the upward reaction force exerted on the roller screw nut 68 is transmitted through the roller adapter shaft 78, the upper roller bearing 84, the bonnet cap 56 and the bonnet 42 to the valve body 12.

It should be recognized that, while the present invention has been described in relation to the preferred embodiments thereof, those skilled in the art may develop a wide variation of structural and operational details without departing from the principles of the invention. Therefore, the appended claims are to be construed to cover all equivalents falling within the true scope and spirit of the invention.

What is claimed is:

1. A gate valve which comprises:
   a valve body which includes a flow bore that extends completely therethrough and a gate cavity that extends partially therethrough and intersects the flow bore;
   a bonnet which is connected to the valve body over the gate cavity;
   a gate which is disposed in the gate cavity across the flow bore and which includes a transverse opening that extends completely therethrough;
   a valve stem which includes a first portion that is connected to the gate and a second portion that extends through the gate cavity;
   a handwheel;
   a roller screw assembly which is connected between the handwheel and the second portion of the valve stem and which converts rotation of the handwheel into translation of the valve stem;
   wherein translation of the valve stem raises or lowers the gate to bring the opening into or out of alignment with the flow bore to either open or close the gate valve, respectively;
   wherein the roller screw assembly includes a roller screw nut which is connected to the handwheel and a roller screw shaft which connected to the valve stem and is rotatably received within the roller screw nut;
   a roller thrust bearing which is secured to the roller screw nut; and
   a roller adapter shaft which includes a lower portion that is secured to the roller screw nut and an upper portion that is connected to the handwheel;
   wherein rotation of the handwheel rotates the roller adapter shaft, the roller screw nut and the roller thrust bearing in unison.

2. The gate valve of claim 1, wherein the roller screw nut includes a radially extending flange which is disposed between the roller thrust bearing and the roller adapter shaft, and the roller screw nut is secured to the roller thrust bearing and the roller adapter shaft through the flange.

3. The gate valve of claim 1, further comprising:
   a bonnet cap which is secured to the bonnet;
   wherein the roller screw nut, the roller thrust bearing and the lower portion of the roller adapter shaft are positioned in the bonnet cap.

4. The gate valve of claim 3, further comprising a lower roller bearing which is positioned between the roller thrust bearing and the bonnet cap.

5. The gate valve of claim 4, further comprising an upper roller bearing which is positioned between the roller adapter shaft and the bonnet cap.

6. The gate valve of claim 4, further comprising a thrust bushing which is positioned between the lower roller bearing and the bonnet.

7. The gate valve of claim 3, further comprising means for exerting rotational drag on the roller adapter shaft.

8. The gate valve of claim 7, wherein the drag means comprises a packing which is positioned between the roller adapter shaft and the bonnet cap.

9. A gate valve which comprises:
   a valve body which includes a flow bore that extends between an inlet port and an outlet port, and a pate cavity that intersects the flow bore;
   a gate which is disposed in the gate cavity across the flow bore;
   a valve stem which includes a first end that is connected to the gate;
   a roller screw assembly which includes a roller screw shaft that is connected to or formed integrally with a second end of the valve stem and a roller screw nut which is rotatably connected to the roller screw shaft; and
   an adapter shaft which is connected to the roller screw nut;
   wherein rotation of the adapter shaft rotates the roller screw nut and thereby moves the roller screw shaft and the valve stem axially to position the gate across the flow bore;
   a bonnet which is connected to the valve body over the gate cavity; and
   a first roller bearing which is positioned between the bonnet and the roller screw nut.

10. The gate valve of claim 9, further comprising a thrust bushing which is positioned between the bonnet and the first roller bearing.

11. The gate valve of claim 9, further comprising a bonnet cap which is secured to the bonnet over the roller screw nut.

12. The gate valve of claim 11, wherein the adapter shaft comprises a radial flange which is positioned within the bonnet cap and the gate valve further comprises a second roller bearing which is positioned between the flange and the bonnet cap.

13. The gate valve of claim 12, further comprising a roller thrust bearing which is positioned between the roller screw nut and the first roller bearing.

14. The gate valve of claim 13, further comprising means for securing the adapter shaft and the roller thrust bearing to the roller screw nut to prevent relative rotation therebetween.

15. The gate valve of claim 14, wherein the securing means comprises at least one pin which extends between the adapter shaft, the roller screw nut and the roller thrust bearing.

* * * * *